April 20, 1937.   C. C. FARMER   2,077,921
LOAD BRAKE MECHANISM
Filed Dec. 11, 1935   3 Sheets-Sheet 1
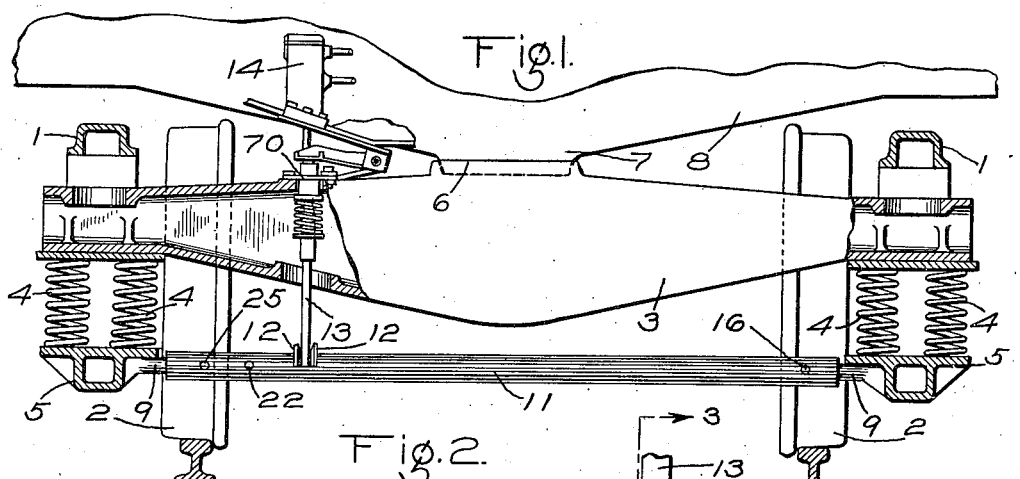
INVENTOR
CLYDE C. FARMER
BY Wm. M. Cady
ATTORNEY

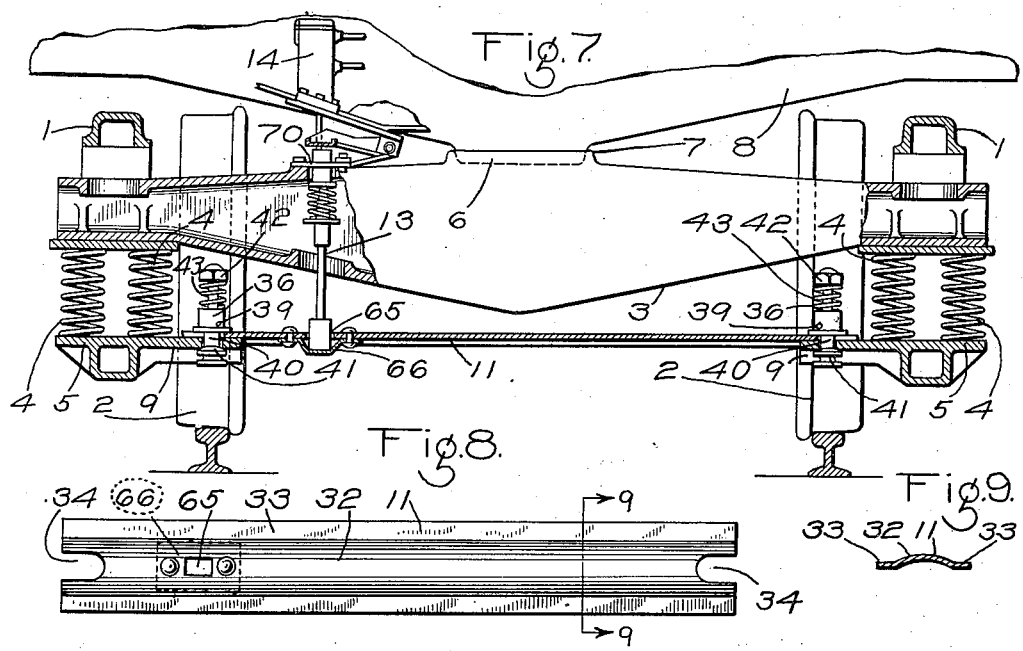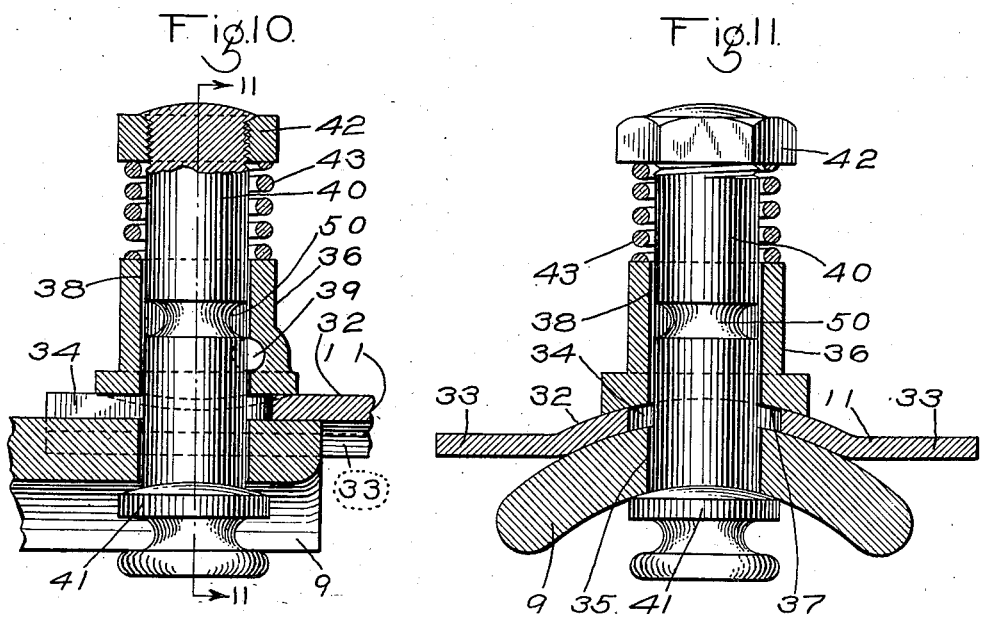

April 20, 1937.  C. C. FARMER  2,077,921
LOAD BRAKE MECHANISM
Filed Dec. 11, 1935   3 Sheets-Sheet 3
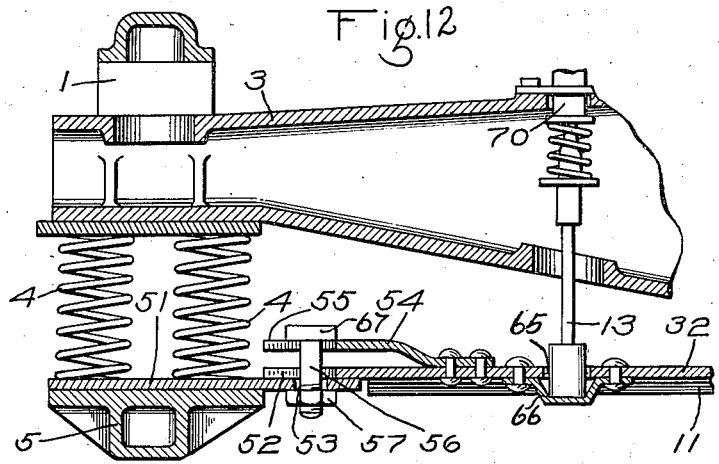
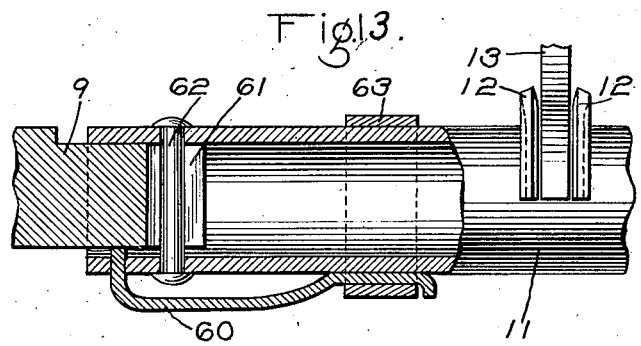
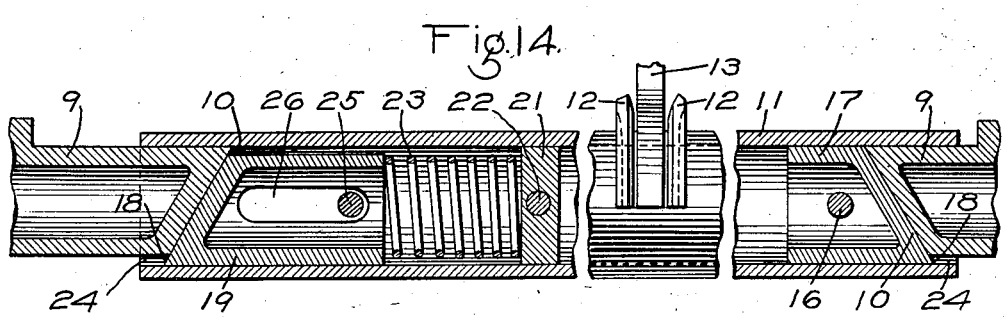
INVENTOR
CLYDE C. FARMER
BY *Wm. M. Cady*
ATTORNEY Patented Apr. 20, 1937

2,077,921

UNITED STATES PATENT OFFICE 2,077,921

LOAD BRAKE MECHANISM

Clyde C. Farmer, Pittsburgh, Pa., assignor to The Westinghouse Air Brake Company, Wilmerding, Pa., a corporation of Pennsylvania Application December 11, 1935, Serial No. 53,854

11 Claims. (Cl. 188—195)

This invention relates to empty and load brake equipment for vehicles and more particularly to that type of empty and load brake equipment which is adapted to be automatically set or conditioned for either light or heavy load braking according to the position the vehicle body assumes relative to a fixed part of a truck of the vehicle under light and heavy loads.

The mechanism for conditioning the brake equipment is usually carried by the vehicle body and is movable vertically therewith and is adapted to be controlled according to the position which the body assumes relative to a fixed part of the vehicle truck under light and heavy loads. This fixed part of the truck, as heretofore proposed, has been in the form of a verticaly disposed strut which, at its lower end, is supported by and secured to the usual heavy spring plank which ties the parallel side frames of the truck together in a more or less rigid manner. The upper end of the strut is adapted to cooperate with the change-over mechanism to control the operation of the mechanism for either light or heavy load service.

There is an increasing interest being shown toward the reduction in the dead weight of railway cars and toward making the trucks of such cars more flexible under ordinary service conditions, and in order to do this it has been proposed to eliminate the spring plank which has considerable weight and which rigidly ties the side frames of the truck together.

It is of course very desirable to have the vertically disposed strut positioned as near as is practicable to the pivotal connection between the vehicle body and the truck where variations in the distance between the change-over mechanism and the strut when the body tilts to one side, due to uneven loading or track conditions, will be so slight as not to interfere with or in any way change the control of the change-over mechanism. In a truck without a spring plank it would be difficult to properly support the strut in its desired position, since there is no part of the truck located directly beneath the control portion of the change-over apparatus which would serve as such a support.

The principal object of the invention is to provide a strut support which is carried by the spaced parallel side frames of a vehicle truck in such a manner that it will not interfere with the flexibility of the truck and which will be light in weight and economical to make.

This object is attained by providing a support member of any suitable shape in cross-section and of a length great enough that the ends overlap the spaced parallel side frames of the truck and by providing a swivel connection between each end of the support and the adjacent side frame which permits the side frames to freely move relative to each other in any direction and which will in no way interfere with such movements.

Another feature of the invention resides in the provision of means whereby the strut support is maintained in firm but yieldable engagement with the truck side frames to prevent objectionable chatter due to vibrations and at the same time permit the side frames to move freely relative to each other and to the support.

Other objects and advantages will appear in the following more detailed description of the invention.

In the accompanying drawings, Fig. 1 is a cross-sectional view of a railway vehicle truck constructed without a spring plank and embodying the invention, a portion of the vehicle body and a portion of an empty and load brake equipment carried thereby being shown in outline; Fig. 2 is an enlarged detail view partly in elevation and partly in section of the strut support and its connection with the side frames; Fig. 3 is a sectional view taken on the line 3—3 of Fig. 2; Fig. 4 is an enlarged detail view partly in section illustrating the upper portion of the strut and a portion of the empty and load brake equipment; Fig. 5 is a plan view of a portion of the truck bolster illustrating the upper end portion of the strut and strut guide; Fig. 6 is a sectional view corresponding to Fig. 3 but illustrating another way of supporting the lower end of the strut; Fig. 7 is a view corresponding to Fig. 1 but illustrating a modified form of the invention; Fig. 8 is a plan view of the strut supporting member employed in said modified form of the invention; Fig. 9 is a sectional view of the strut support taken on the line 9—9 of Fig. 8; Fig. 10 is an enlarged detail vertical sectional view taken transversely of the truck and illustrating the connection between the strut supporting member and one of the side frames of the truck; Fig. 11 is a vertical sectional view taken on the line 11—11 of Fig. 10; Figs. 12 and 13 are fragmentary sectional views transversely of the truck and each illustrates a modification of the invention; Fig. 14 is a fragmentary sectional view of the strut supporting construction and illustrating means which may be embodied in the construction for facilitating the application or removal of the strut supporting member in assembling or disassembling the truck; and Fig. 15 is a fragmentary sectional view illustrating means which may be embodied in the construction shown in Figs. 2 and 14 for facilitating the application or removal of the strut supporting member.

As shown in Figs. 1, 7 and 12, the car truck may comprise spaced truck frames 1 which are carried by the truck wheels 2 through the medium of the usual axles, axle bearings and journal boxes (not shown).

The truck may also comprise a truck bolster 3 which is carried by the truck frames through the medium of the usual springs 4 which are carried by the bottom members or chords 5 of the truck frames. The truck bolster is movable vertically relative to the side frames and at each of its ends is slidably guided in the usual manner by the adjacent side frame. The truck bolster 3 is provided, intermediate its ends, with a center plate 6 which cooperates with the usual body center plate 7, carried by the body bolster 8 of the car body, to form the pivotal connection between the truck and car body.

It will here be noted that the spring plank which has heretofore been employed for tying the side frames of the truck together has been omitted for the purpose of increasing the flexibility of the truck as a whole. Aside from this omission the truck as thus far described may be of any of the usual well known constructions.

As shown in Figs. 1 and 2 of the drawings, the bottom member 5 of each side frame 1 is provided with an inwardly extending horizontally disposed bracket 9 having a sloping end face 10. This bracket may be integral with the side frame and may be of annular form in cross-section or of any other desired form.

Located beneath the truck bolster 3 and extending transversely of the truck is a light tubular strut supporting member 11 which, at its ends, telescopes and is supported by the brackets 9. The member 11, intermediate its ends is provided with spaced exterior guides 12 which may be welded or otherwise secured to the member. Loosely resting on that portion of the member 11 which is between the guides 12 and extending upwardly through openings in the truck bolster is a strut 13. The upper end of the strut extends beyond the upper surface of the bolster and is adapted to cooperate with the strut cylinder device 14 of an empty and load fluid pressure brake changeover mechanism to control the operation of the mechanism according to movement of the vehicle body relative to the strut to condition the brake equipment for either empty or load braking. The change-over mechanism may be the same as that fully shown, described and claimed in a joint application of Earle S. Cook and Ellis E. Hewitt, Serial No. 51,798, filed November 27, 1935.

Instead of having the lower end of the strut 13 rest on the outer surface of the support member 11 as shown in Figs. 1, 2 and 3, an alternative construction such as is shown in Fig. 6 may be employed in which the lower end of the strut rests on the interior wall of the support member 11, the support member being provided with a suitable opening 15 for the reception of the lower end portion of the strut.

Contained in one end of the support member and secured thereto by a pin 16 is a stationary abutment 17 having a sloping end face 18 which engages the sloping face 10 of the bracket 9 at one side of the truck. Slidably mounted in the other end of the support member is a movable abutment 19 having a sloping face 20 which engages the sloping face 10 of the bracket 9 at the other side of the truck.

Interposed between and operatively engaging one end of the abutment 19 and a spring seat 21 which is secured to the support member 11 by means of a pin 22, is a spring 23 which acts to maintain both abutments in close engagement with the ends of the brackets 9 as shown in Fig. 2.

As shown in Fig. 2 a clearance space 24 is provided between each of the brackets 9 and the interior surface of the supporting member 11, so that the bracket is permitted to freely rock about its axis when, due to uneven track or bad rail joints, the truck frame tilts in the direction of its length. These clearance spaces also serve to permit free angular movement of the supporting member relative to the side frames when the side frames, due to uneven track, move vertically relative to each other. From this it will be understood that the connection between each side frame 1 and the supporting member 11 is such that it permits universal movements between these elements, so that any movement of one side frame relative to the other will not be transmitted through the supporting member to said other side frame. Thus, the supporting member 11 will in no way materially interfere with or impair the flexibility of the truck.

While the connections between the brackets 9 and the supporting member must be free enough to permit the movements between the side frames and member as above described, it is also necessary to at all times maintain a close contact between the brackets 9 and the supporting member 11 so as to prevent undesirable chatter when the truck is in transit. This is accomplished by means of the abutments 17 and 19 and the cooperating spring 23, said spring urging the abutments apart and the sloping faces of the brackets and abutments cooperating, under the influence of the spring pressure, to maintain the interior surface of the supporting member in close engagement with the upper part of the outer surfaces of the brackets 9. Besides holding the supporting member in close engagement with the brackets 9 this arrangement also serves to prevent rotation of the supporting member.

The support member is mounted on the brackets 9 when the side frames are being placed in position in assembling the truck and cannot be removed so long as the side frames are in their proper positions. The abutment 19 is secured to the support member 11 against accidental separation therefrom by means of a pin 25 which is passed through openings in the member 11 and through slotted openings 26 in the abutment, only one of which slotted openings is shown in the drawings. The openings 26 are made in the form of slots to provide the necessary free movement of the abutment 19 relative to the support member.

The strut 13 illustrated in the drawings is adjustable in length by means of a mechanism 70 which is carried by the truck bolster and since this mechanism is not essential to the present invention and is covered in a separate application of mine, Serial No. 53,855, filed December 11, 1935, a detailed description in this specification is deemed unnecessary.

If it should be desired to provide for the removal and replacement of the strut support member 11 with the side frames in their proper assembled position, the construction shown in Fig. 14 may be employed in lieu of the construction just described. In this construction the slotted openings 26 in the abutment 19 are made long enough to permit the support member 11 to be moved longitudinally toward the left hand a sufficient distance for the right hand end of the member to clear the end of the adjacent bracket 9. After the right hand end of the member is clear of the adjacent bracket 9 the member may be moved downwardly far enough to clear the side frame and may then be moved longitudinally out of engagement with the bracket 9 on the side frame at the left hand side of the truck.

If it should be desired to nullify the action of the plunger 19 under the influence of the pressure of the spring 23 to facilitate the removal or replacement of the member 11, the construction shown in Fig. 15 may be substituted for the construction shown in Figs. 2 and 14. In the construction shown in Fig. 15, the abutment 19 is provided with a recess 27 which, at all times is in communication with an opening 28 in the member 11. When it is desired to move the plunger 19 to a position in which it will not engage the bracket 9, a bar is passed through the opening 28 into engagement with the plunger 19 within the recess 27 and by means of said bar the abutment is pried to the position in which it is shown, in which position a recess 29 in the abutment registers with an opening 30 in the member 11. To hold the abutment in this position when the bar is removed, a pin 31 is inserted in the recess 29 and opening 13. Upon the removal of the pin the abutment 19 will be moved into engagement with the bracket 9 by the action of the spring 23.

In Figs. 7 to 11 inclusive, a modification of the invention is illustrated in which the strut supporting member is made from light sheet metal and which is provided with an upwardly extending curved corrugation 32 and horizontally disposed edge flanges 33. At each end of the member the under surface of the corrugation slidably contacts with a correspondingly curved upper surface of an adjacent bracket 9 of a side frame. Each end of the support member is provided with an open end slot 34 which is adapted to register with an opening 35 in the bracket 9.

Located above the supporting member is a plunger 36 having a surface 37 slidably contacting with the upper surface of the corrugation 32, the contacting surface of the plunger being curved to correspond with the shape of the corrugation. The plunger is provided with a central vertical bore 38 which registers with the slot 34 in the supporting member and is further provided with a bore 39 which extends at right angles to the bore 38.

Extending through the opening 35 in the bracket 9, slot 34 in the supporting member and bore 38 in the plunger is a bolt 40 having at its lower end a head 41 which is adapted to engage the lower surface of the bracket 9. The bolt extends beyond the upper edge of the plunger 36 and at its end is provided with a shoulder in the form of a nut 42 which in the present embodiment has screw threaded connection with the bolt. The bolt may be peened over the nut to prevent the nut from slacking off. Interposed between and engaging the nut 42 and the adjacent end of the plunger is a spring 43 which acts to maintain the head 41 of the bolt in close contact with the bracket 9 and which also acts to maintain the plunger in close contact with the supporting member and the supporting member in close contact with the bracket 9.

It will here be understood that the construction just described will provide a chatterless connection between each side frame and the strut supporting member which will permit free relative movements between the side frames and the supporting member.

The bolt 40, intermediate its ends is provided with a continuous groove 50 which when the bolt is moved downwardly relative to the plunger is adapted to register with the bore 39. Preparatory to applying the support member to the truck or removing it therefrom, each of the bolts is moved downwardly to this position and a pin or the like is then inserted through the bore into engagement with the bolt within the groove 50. This locks the bolt and plunger together so that the plunger can no longer exert pressure on the supporting member. By reason of this the application and removal of the supporting member are facilitated. When the supporting member is properly positioned, the pin which locks the bolt and plunger together is removed, whereupon the construction again functions to maintain the several parts against chatter.

In the form of the invention shown in Fig. 12, the bottom member of each side frame is provided with a spring seat 51 of sheet metal which extends in a direction transversely of the truck to a point beyond the supporting side frame and serves as a bracket upon which rests the adjacent end of the strut supporting member. The strut supporting member may be of the same shape in cross-section as the supporting member shown in Fig. 8 and is provided at each end with an open ended slot 52 which registers with an opening 53 in the spring seat. Secured to the upper side of each end of the supporting member is a spring 54 which extends longitudinally of the member and which for the greater portion of its length is spaced away from the upper surface of the member. The outer end of the spring 54 is provided with an open ended slot 55 which registers with the slot 52. A bolt 56 extends through the registering slots 52 and 55 and opening 53, the head 67 of the bolt engaging the upper surface of the spring 54. The other end of the bolt is provided with a nut 57 which engages the bottom surface of the spring seat 51 and when the nut is turned on the bolt the spring 54 is conditioned to maintain the strut supporting member in non-chattering engagement with the spring seat.

When the strut supporting member 11 is of the form shown in Figs. 7 and 12, the lower end of the strut 13 extends through an opening 65 in the corrugation 32 and rests on a strap member 66 which is disposed within the corrugation and which is riveted or otherwise secured to the member 11.

In the form of the invention shown in Fig. 13 the strut supporting member 11 is of tubular form and is supported at each end by a bracket 9 carried by the bottom member of a side frame. In this construction each end of the supporting member is provided with a spring 60 which frictionally engages the lower surface of the bracket 9 and which acts to maintain the supporting member in close engagement with the bracket 9. Extending through the supporting member and engaging the bracket 9 within a slot 61 is a rivet 62 which is adapted to prevent undue rotation of the supporting member relative to the bracket. The width of this slot is however great enough to permit the bracket to rock when, in transit, the truck frame tilts in the direction of its length.

The spring 60 may be secured to the supporting member in any desired manner, but as shown may be secured by means of an annular member 63 which surrounds the supporting member and clamps the spring in place.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a load brake controlling mechanism, in combination, a vehicle truck having a plurality of laterally spaced independently movable side frames, a member extending transversely of the truck and supported at its ends by said side frames, spring controlled wedge means for preventing free movement of said member relative to said side frames and for providing articulate connections between the member and side frames to prevent movement of one side frame being transmitted through the member to the other side frame, said member being adapted to support a mechanism operating element.

2. In a load brake controlling mechanism, in combination, a vehicle truck having a plurality of laterally spaced side frames carrying bolster springs for supporting a truck bolster, an empty and load brake controlling strut supporting member extending transversely of the truck and supported by said side frames, means separate from said bolster springs for maintaining each end of said member in close engagement with the adjacent side frame, said means being also adapted to prevent the transmission of such forces transversely through said member from one side frame to the other as would tie or brace said frames together.

3. In a load brake controlling mechanism, in combination, a vehicle truck having a plurality of laterally spaced independently movable side frames carrying bolster springs for supporting a truck bolster, a bracket carried by each side frame and extending inwardly in a direction transversely of the truck, an empty and load brake controlling strut supporting member supported at each end by the adjacent bracket, an articulate joint between each bracket and the adjacent end of said member to prevent the member from either tying or bracing said side frames together transversely of the truck and to prevent forces from being transmitted from one side frame to the other, and means separate from said bolster springs for holding each end of said member in close contact with the adjacent bracket to prevent chatter.

4. In a load brake controlling mechanism, in combination, a vehicle truck having a plurality of laterally spaced independently movable side frames carrying bolster springs for supporting a truck bolster, a bracket carried by each side frame and extending inwardly in a direction transversely of the truck, an empty and load brake controlling strut supporting member supported at each end by the adjacent bracket, each end of the member overlapping the adjacent bracket, an articulate joint between each bracket and the overlapping adjacent end of said member, and means separate from said bolster springs for holding said member to said brackets with sufficient pressure to maintain the member and brackets in close contact but with insufficient pressure to permit said member to transmit forces from one side frame to the other, said member and the connection between the member and brackets being ineffective to either tie or brace said members together transversely of the truck.

5. In a load brake controlling mechanism, in combination, a vehicle truck having a plurality of laterally spaced independently movable side frames, a bracket carried by each side frame and extending inwardly in a direction transversely of the truck, a tubular empty and load brake controlling strut supporting member telescoping the ends of said brackets, and spring controlled wedge means contained in said member cooperating with said brackets to hold the member in close contact with said brackets to prevent chatter, the power of said wedge means being insufficient to permit the transmission of movement of one side frame to the other through the medium of said member.

6. In a load brake controlling mechanism, in combination, a vehicle truck having a plurality of laterally spaced independently movable side frames, a bracket carried by each side frame and extending inwardly in a direction transversely of the truck, a tubular empty and load brake controlling strut supporting member telescoping the ends of said brackets, and spring controlled means cooperating with each of said brackets and the member to hold the member in close contact with the brackets, the power of said spring controlled means being insufficient to permit the transmission of forces from one side frame to the other when relative movement occurs between the side frames.

7. In a load brake controlling mechanism, in combination, a vehicle truck having a plurality of laterally spaced independently movable side frames carrying bolster springs for supporting a truck bolster, an empty and load brake controlling strut supporting member extending transversely of the truck and supported by said side frames but being ineffective to either tie or brace said side frames together transversely of the truck, and spring controlled means separate from said bolster springs cooperating with each of said brackets and the adjacent end of said member for holding each end of the member in close contact with the adjacent bracket, the power of said spring means being insufficient to permit the transmission of forces from one side frame to the other when relative movement occurs between the side frames.

8. In a load brake controlling mechanism, in combination, a vehicle truck having a plurality of laterally spaced independently movable side frames, an empty and load brake controlling strut supporting member supported at its ends by said brackets and having an articulate connection at each end with the adjacent bracket, and means located at each end of the member for holding the member against free movement relative to the brackets to prevent chatter, said means comprising a vertically disposed bolt extending through each bracket, a head on said bolt engaging the underside of the bracket, a plunger slidably engaging the upper surface of the member, a collar on said bolt, and a spring interposed between and engaging said collar and plunger for forcing said plunger in close contact with said member and thereby said member in close contact with said bracket.

9. In a load brake controlling mechanism, in combination, a vehicle truck having a plurality of laterally spaced independently movable side frames, an empty and load brake controlling strut supporting member supported at its ends by said brackets and having an articulate connection at each end with the adjacent bracket, and means located at each end of the member for holding the member against free movement relative to the brackets to prevent chatter, said means comprising, a resilient member carried by each end of said member, a bolt extending through said resilient member, strut supporting member, and adjacent bracket, means on said bolt engaging the lower surface of said bracket and means on said bolt engaging the upper surface of said resilient member, the means on said bolt cooperating with said bracket and resilient means to cause said resilient means to hold the supporting member in close contact with the bracket to prevent chatter, the force of said resilient members being insufficient to permit movement of one side frame to be transmitted through the supporting member to the other side frame.

10. In a load brake controlling mechanism, in combination, a vehicle truck having a plurality of laterally spaced independently movable side frames, a bracket carried by each side frame and extending inwardly in a direction transversely of the truck, a tubular empty and load brake controlling strut supporting member telescoping the ends of said brackets, spring controlled means cooperating with each of said brackets and the member to hold the member in close contact with the brackets, the power of said spring controlled means being insufficient to permit the transmission of forces from one side frame to the other when relative movement occurs between the side frames, and means included in said spring means movable by a tool inserted through an opening in the member to a position for rendering the spring means ineffective to hold the member in close contact with the brackets.

11. In a load brake controlling mechanism, in combination, a vehicle truck having a plurality of laterally spaced independently movable side frames, a bracket carried by each side frame and extending inwardly in a direction transversely of the truck, a tubular empty and load brake controlling strut supporting member telescoping the ends of said brackets, spring controlled means cooperating with each of said brackets and the member to hold the member in close contact with the brackets, the power of said spring controlled means being insufficient to permit the transmission of forces from one side frame to the other when relative movement occurs between the side frames, and means included in said spring means movable by a tool inserted through an opening in the member to a position for rendering the spring means ineffective to hold the member in close contact with the brackets, said means being adapted to be maintained in said position by a pin insertable in registering openings in said means and member.

CLYDE C. FARMER.